United States Patent
Klein et al.

(10) Patent No.: US 9,910,480 B2
(45) Date of Patent: *Mar. 6, 2018

(54) MONITORING AND REAL-TIME ADJUSTMENT OF POWER CONSUMPTION SETTINGS

(71) Applicant: Amazon Technologies, Inc., Reno, NV (US)

(72) Inventors: Matthew David Klein, Seattle, WA (US); Michael David Marr, Monroe, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/096,096

(22) Filed: Apr. 11, 2016

(65) Prior Publication Data

US 2016/0224094 A1    Aug. 4, 2016

Related U.S. Application Data

(63) Continuation of application No. 13/622,922, filed on Sep. 19, 2012, now Pat. No. 9,310,864.

(51) Int. Cl.
*G06F 1/32* (2006.01)
*G06F 1/28* (2006.01)
*G06F 1/26* (2006.01)

(52) U.S. Cl.
CPC .............. *G06F 1/3234* (2013.01); *G06F 1/26* (2013.01); *G06F 1/28* (2013.01); *G06F 1/3206* (2013.01)

(58) Field of Classification Search
None
See application file for complete search history.

(56) References Cited

U.S. PATENT DOCUMENTS

| 6,513,124 B1 | 1/2003 | Furuichi et al. |
| 2007/0198864 A1 | 8/2007 | Takase |
| 2007/0245163 A1 | 10/2007 | Lu et al. |

(Continued)

OTHER PUBLICATIONS

"Non Final Office Action dated Feb. 6, 2015" received in U.S. Appl. No. 13/622,922.

(Continued)

*Primary Examiner* — Kim Huynh
*Assistant Examiner* — Joshua Neveln
(74) *Attorney, Agent, or Firm* — Hogan Lovells US LLP

(57) ABSTRACT

Customers in a multi-tenant environment can obtain energy consumption information for a set of resources or other computing components used by those customers, including time-accurate accounting for various components of those resources utilized on behalf of the customer. A customer can also have the ability to specify how the resources are to be operated when used for the customer, in order to manage the amount of energy consumption. The accounting can be performed even when the resources are shared among multiple users or entities. Various hardware components or agents can be used to provide detailed energy consumption information for those components that is associated with a particular customer. The information can be used not only for accounting and monitoring purposes, but also to make dynamic adjustments based on various changes in usage, energy consumption, or other such factors.

20 Claims, 7 Drawing Sheets

(56) References Cited

U.S. PATENT DOCUMENTS

| | | |
|---|---|---|
| 2008/0028246 A1 | 1/2008 | Witham |
| 2010/0218014 A1 | 8/2010 | Bozek et al. |
| 2011/0145612 A1 | 6/2011 | Gellerich et al. |
| 2011/0213997 A1* | 9/2011 | Kansal .................. G06F 1/3203 713/324 |
| 2011/0252248 A1* | 10/2011 | Cameron ............... G06Q 10/04 713/300 |
| 2011/0283121 A1 | 11/2011 | Kuroda |
| 2012/0011358 A1 | 1/2012 | Masone |
| 2012/0054514 A1 | 3/2012 | Barsness et al. |
| 2012/0226796 A1 | 9/2012 | Morgan |

OTHER PUBLICATIONS

"Final Office Action dated Sep. 17, 2015" received in U.S. Appl. No. 13/622,922.

"Notice of Allowance dated Dec. 18, 2015" received in U.S. Appl. No. 13/622,922.

\* cited by examiner

MONITORING AND REAL-TIME ADJUSTMENT OF POWER CONSUMPTION SETTINGS

CROSS-REFERENCE TO RELATED APPLICATIONS

This application is a continuation of U.S. patent application Ser. No. 13/622,922, filed on Sep. 19, 2012 of which the full disclosure of this application is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, a user or service provider would like to know how much energy is consumed through usage of these resources. For many hardware devices, however, it can be difficult to obtain an accurate accounting of energy consumption. Further, there might be multiple users or entities sharing a resource, and it can be difficult to accurately apportion the energy consumption among the users based on their relative usage. Further still, a user has very little control over the power states or operational states of these resources and components, which can be frustrating or at least inconvenient for a user, particularly where there are regulations on energy consumption or the user gets credits for reducing consumption.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing shared, single-tenant, and/or multi-tenant resources in an electronic environment. In particular, various embodiments monitor the energy consumption of various resources and/or computing components that is attributable to usage of a particular customer. The energy consumption information can be provided to the customer such that the customer can make adjustments in usage, if desired, to reduce the amount of consumption, purchase environmental credits for the amount of consumption, or perform another such task, workload, etc. At least some embodiments provide services wherein a customer can request certain energy profiles or energy options, whereby a provider of the resources can adjust the resources allocated to that customer according to the request. In at least some embodiments, control over the power states of various components can be exposed to the customer, whereby the customer can make at least some adjustments to the operational state and/or power state of one or more components in order to manage the amount of energy consumption.

In some embodiments a system or service can also monitor the various ramp up, ramp down, provisioning, and other portions of a process that can also be attributed to a customer, can determine an appropriate energy consumption for each, and can determine an appropriate amount of energy consumption to allocate to the customer. In some embodiments, a hardware and/or software-based approach can be used to determine an amount of energy consumption attributable to each relevant customer in the event of a context switch for a particular resource, such as a processor.

Many other alternatives and variations are described and suggested below in relation to at least some of the various embodiments.

Figure 1:
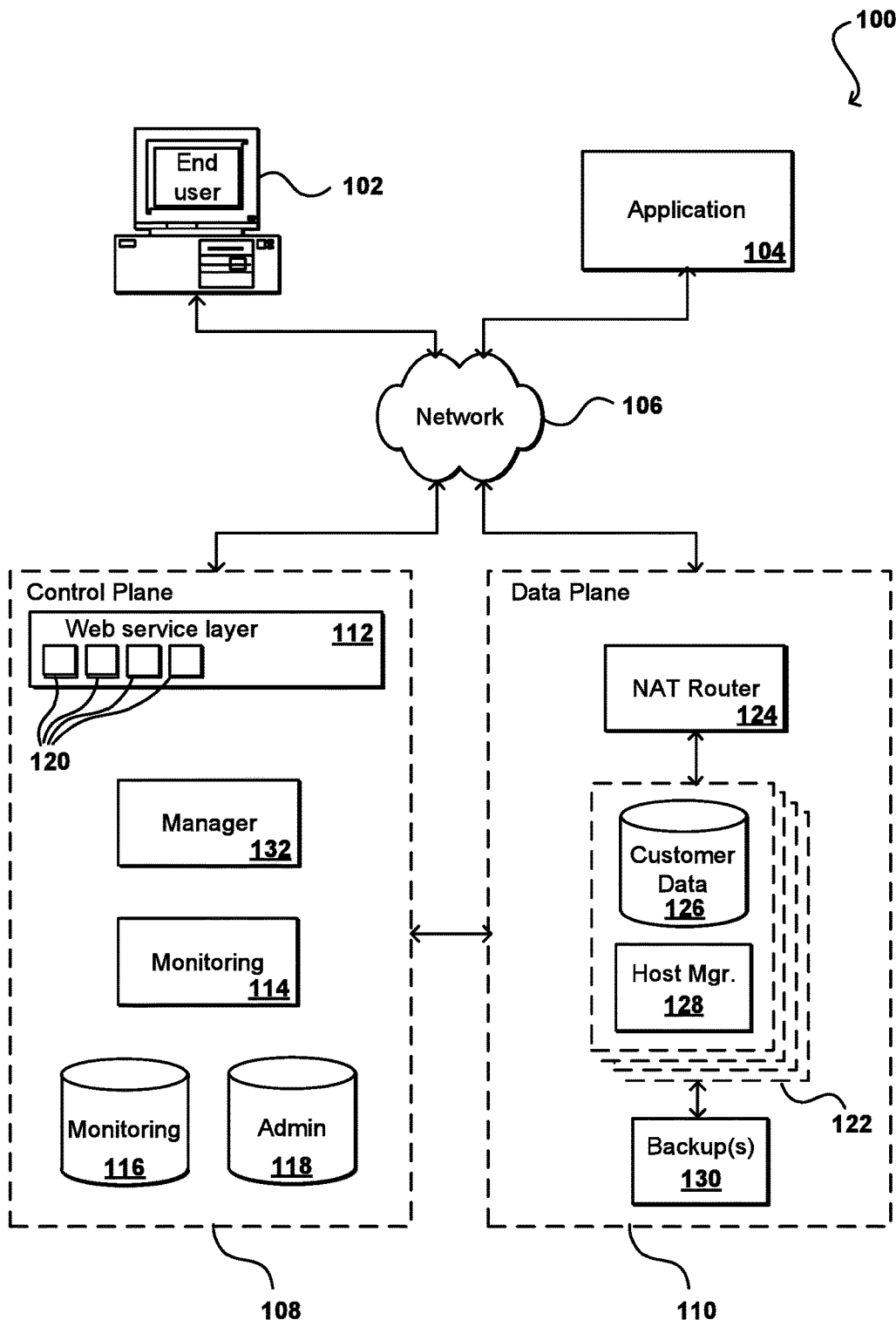
FIG. 1 illustrates an environment for providing access to various resources that can be used in accordance with various embodiments.

Systems and methods in accordance with various embodiments provide at least one resource access gateway, or control plane 108, either as part of a data environment or in a path between an end user device 102 and a data plane 110, as illustrated in the example environment 100 of FIG. 1. A control plane can enable users and applications to access shared and/or dedicated resources, offered by one or more resource providers, while allowing customers, administrators, or other authorized users to allocate at least some of these resources to various users, clients, or applications and ensure adherence to those allocations. A user then can perform tasks such as storing, processing, and querying relational data sets in a "cloud" of these resources. Guest users can also obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared and/or dedicated access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

In the example of FIG. 1, a computing device 102 for an end user is shown to be able to make calls through at least one appropriate network 106, such as the Internet or a cellular network, for example, to a control plane 108 (or other such access layer) to perform a task such as to obtain access to a specified resource or resource type. While an end user computing device 102 and a third party application 104 are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to establish a connection to a data repository to execute a query for a user. In this example, the Web services layer can parse the request to determine the type of connection or access needed, the appropriate type(s) of resource needed, or other such aspects.

The control plane can include one or more resource allocation managers 132, or "cloud managers," each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a domain name, IP address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port number to be used to access a resource. A user then can access the resource directly using the IP address and port, without having to access or go through the control plane 108.

The control plane 108 in this embodiment also includes at least one monitoring component 114. When a data instance or other resource is allocated, created, or otherwise made available in the data plane, information for the resource can be written to a data store accessible to the control plane, such as a monitoring data store 116. It should be understood that the monitoring data store can be a separate data store or a portion of another data store. A monitoring component 114 can access the information in the monitoring data store 116 to determine information such as the past usage of resources by various users, a current number or type of hardware threads or other computing resources being allocated to a user, and other such usage information. A monitoring component also can call into components of the data environment to determine information such as the number of active network connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 118, which can store information such as the general allocation granted to a user, throttling or limiting information for a user, resource permissions for a user, or any other such information that can be specified and/or updated by an administrator or other such user.

In at least some embodiments, physical resources such as host servers can support one or more customer instances, which might each include a guest operating system (OS) and software that are to be executed on the host device. In an example where users request connections to various data instances, each instance 122 in the data environment can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 132 can communicate periodically with each host manager 128 for which a connection has been established, or to an administration server or other component of the resource environment, to determine status information such as load, utilization levels of various resources, capacity, etc.

As discussed, once a resource is provisioned and a user is provided with an IP address derived from DNS mappings or other address or location, the user can communicate "directly" with components or resources of the data plane 110. An IP address derived from DNS mappings is beneficial in such a dynamic cloud environment, as instance or availability failures, for example, can be masked by programmatically remapping the IP address to any appropriate replacement instance for a use. Other dynamic mappings of addresses to physical substrate servers are possible, for example with the use of network address translation (NAT) or overlay networks. A request received from a user device 102 or application 104, for example, can be directed to a NAT router 124, or other appropriate component, which can direct the request to the actual resource 122 or host corresponding to the mapped address of the request. Such an approach allows for instances to be dynamically moved, updated, replicated, etc., without requiring the user or application to change the IP address or other address used to access the instance. In some cases, a resource 122 such as a data instance can have at least one backup instance 130, copy in persistent storage, etc.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and simpler guest instance images can be used, as guests do not need a multitude of hardware-specific drivers.

Resource providers can, in at least some embodiments, provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine running an OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some embodiments, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

Figure 2:
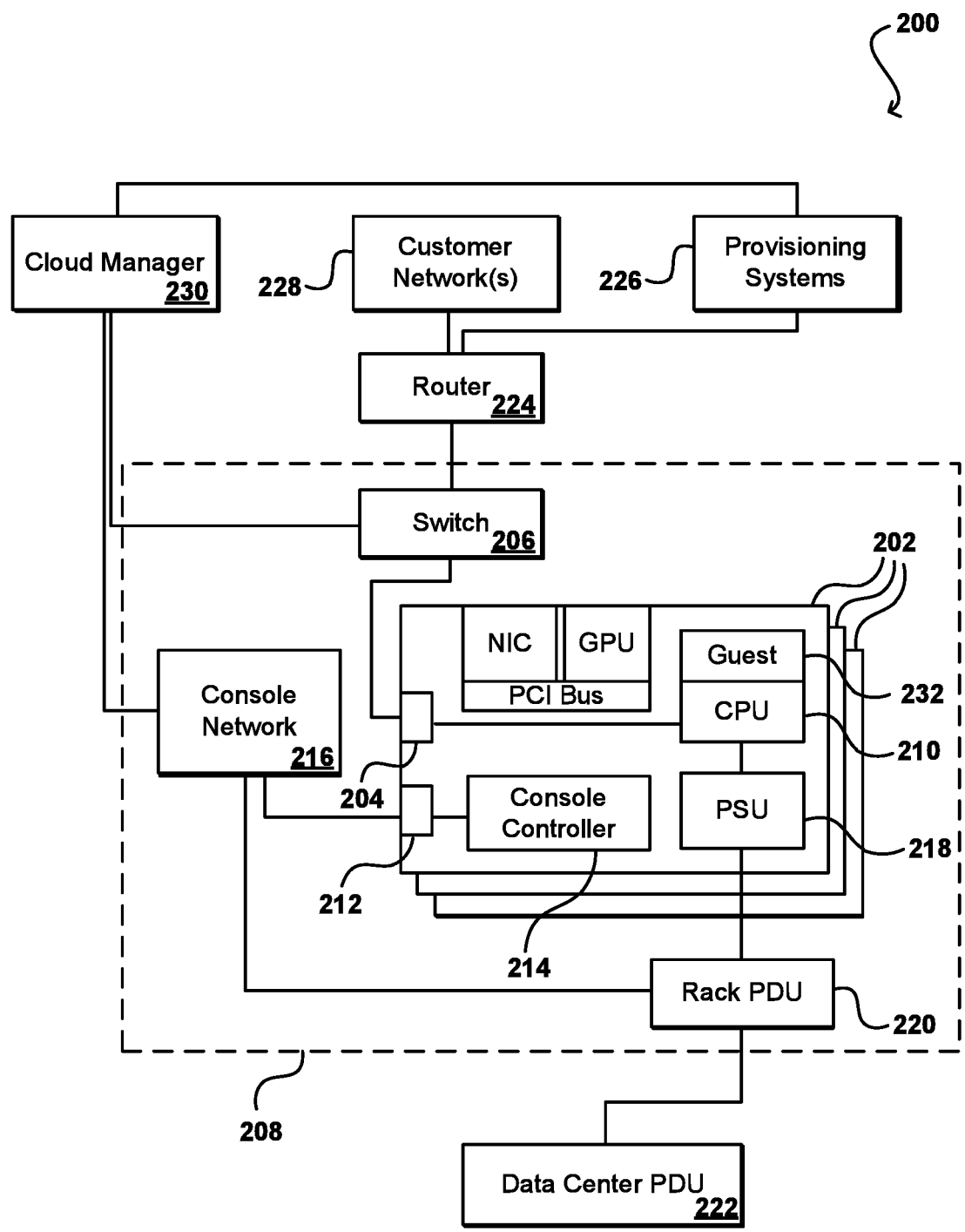
FIG. 2 illustrates a configuration for providing access to specific hardware resources that can be used in accordance with various embodiments.

FIG. 2 illustrates an example of a configuration 200 that can be used to provide a customer with access to at least part of a set of resources 202 in accordance with one embodiment. The access can be full access, or at least partial access, to the underlying hardware, or can be restructured only to access to a virtual host or instance, with limited if any access to the supporting hardware. Various other types of access can be provided as well within the scope of the various embodiments. This example will be discussed with respect to granting a user access to a host machine using conventional PCI-based technology, but it should be understood that this is merely an example and that approaches within the scope of the various embodiments can be used with any appropriate hardware, software, and protocols currently used or subsequently developed for such purposes.

This example configuration 200 includes a set of host devices 202, such as servers or similar devices, that each can have a series of network ports 204. Some of these ports can function as "production" ports which connect each host to at least one "smart" network switch 206 capable of processing and routing network traffic to/from each host device 202. In a data center example, there might be one smart switch for each rack of servers 208, for example. At least one of these network ports 204 can be used by a guest operating system 232 for a host, where the guest is effectively operating "on top of" at least one central processing unit (CPU) 210 in the allocated or partitioned host device (e.g., server) 202 that has access to this production network port. The host device 202 also can have at least one console port 212 and a console controller 214, which can connect to a separate console network 216. In some embodiments, at least some of these ports can be merged but logically separated (e.g., muxed on the same physical port). Each host device also can have one or more dedicated power supply units (PSUs) 218, which can be accessed by the console controller 214 and/or the main CPU 210, whereby the machine can be powered off, or have a power level adjusted, via either the host CPU or a device on the network, for example. The power supply for every server in a rack can be connected to a rack power distribution unit (PDU) 220, which can be connected by a higher power cable to one or more data center PDUs 222, each of which can support multiple rack PDUs. In some cases, the hosts 202 can be powered on and off directly using a "smart" rack PDU 220 connected to the console network 216 or similar control network with relays or other such components to power cycle each device without requiring cooperation from the console controller 214. Similarly, multiple host devices 202 may share a single PSU 218, which likewise may provide power control to these individual host devices and which is directly managed by the console network 216 or similar network (not depicted in FIG. 2).

At least one router 224 can connect the host devices 202 to one or more provisioning systems 226, and the switch and/or router can manage access to these provisioning systems. In some embodiments a capability such as a preboot execution environment (PXE) exists on a host machine 202. Power can be cycled using the console (or other power control mechanism previously described). As the machine boots, the PXE firmware can execute additional stages of boot software delivered from the network port 204. The PXE environment can download a management operating system to the machine, for example into a RAM (random access memory) disk or other block of storage, to enables control operations such as firmware flashing or provisioning of a new customer image. Provisioning images thus can be received, over the network to the PXE environment, which contain firmware flashing tools or other provisioning code. Once provisioning is completed, authorized customer networks 228 can interact with the devices 202 via the switch 206. The provisioning and control systems can control the switch in real time with no humans involved, as the automatic switching of that path can be based on provisioning events and external coordination, for example. The coordination can be provided and/or managed by an external system, such as a cloud manager system 230 or service, or other such control plane or control system as discussed elsewhere herein, which can instruct the provisioning system(s) 226, console network 216, and host machines 202 or other such resources to perform certain actions. The cloud manager 230 can include one or more workflow systems that work with a central database, in one embodiment, to perform various aspects of resource management.

As mentioned, customers provisioned on these host machines 202 might be interested in information about the amount of energy consumed by these resources, or "computing components," particularly as are attributable to customer actions. For example, a customer might work for a "green" company that attempts to offset any environmental impact of that company's actions. In some instances, a customer might be in an area where there are regulations regarding energy consumption. In other cases, there might be incentives for customers who reduce their energy consumption. Further still, there might be customers who prefer to have a more accurate accounting of the costs for their usage of various resources, particularly where there are excess costs for certain levels of energy usage. Various other reasons for wanting more granular energy information and/or control can exist as well in other situations.

Accordingly, systems and methods in accordance with various embodiments can attempt to monitor and accurately determine information regarding energy consumption for various resources and/or computing components that can be attributed to specific customers. Systems and methods in accordance with various embodiments can also enable a customer to manage various power states, operational modes, or other aspects of those resources or computing components in order to control the amount of energy consumption that is attributable to that customer. As referred to herein, computing components can refer to components such as, for example, processors (e.g., CPUs), memory, network interface cards, storage devices, graphics processors, and other PCI devices that can be used to perform and/or assist in the performance of a computing operation as discussed and suggested herein.

Figure 3:
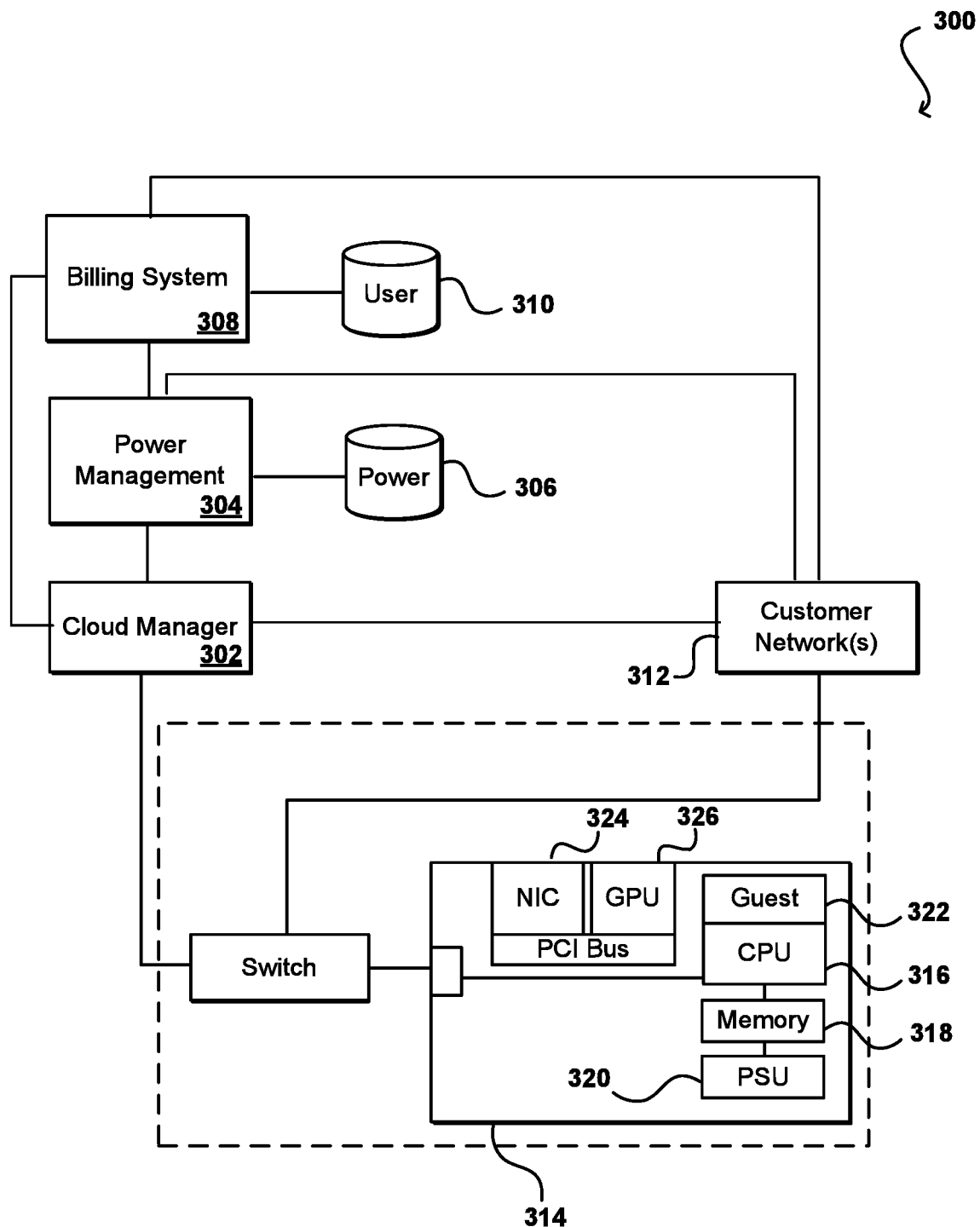
FIG. 3 illustrates a configuration for managing power state information for a one or more components of a provisioned host machine that can be used in accordance with various embodiments.

FIG. 3 illustrates an example environment 300 wherein a customer is provisioned on a single host machine 314 of a multi-tenant environment in accordance with various embodiments. It should be understood that the customer can be provisioned on multiple resources of one or more types, and that the example of a single host is provided for simplicity of explanation. There also can be additional customers, users, applications, or other such entities provisioned on, or having access to, that host device as well in various embodiments. In some embodiments, the user might have dedicated and/or full access to the host device 314 for at least a period of time. Various other types of access can be provided as well within the scope of the various embodiments.

In this example, a cloud manager 302 or other such component can manage the provisioning of a customer instance, associated with one or more customer networks 312, on the host machine 314, as well as the access to various components of the host machine. These components can include, for example, at least one CPU 316, a portion of memory 318, and one or more peripheral devices, such as a network interface card (NIC) 324 or a graphics processing unit (GPU) 326. Each host machine 314 also can have one or more dedicated power supply units (PSUs) 320. For customer instances, a guest operating system 322 can be executed using at least one of the allocated CPUs. A power management service 304, which can be separate from, or a part of, the cloud manager 302, can be in communication with any or all of these components, in order to determine a current power state, operational state, energy consumption rate, or other such information that can be used to determine an amount of energy consumption for each of these components over a period of time. The energy information can be stored to a power data store 306 or other such location for subsequent retrieval. A customer can send a request, such as a Web service request, to an API or other interface of the power management service 304. The power management service can utilize information about the amount of energy consumption of the various components, as well as information about the periods of time in which various components were being used for activities related to the customer, to determine an amount of energy consumption attributable to the customer. The power management service can then send a response to the customer network 312 regarding the amount of energy consumption. The same, or similar, data can also be provided to a billing system 308, which can store the data to a user data store 310 or other such location for use in determining appropriate billing for the customer, as may be based at least in part upon the determined amount of energy consumption. The billing might not only take into account the type of resources used and the amount of time each resource was used by a customer, but might also take into account the power state, operational state, or other such aspect of the resource during the access. In at least some embodiments, a customer might get a lower rate for using resources in lower energy consumption states, or lower power states. In some embodiments, this might involve configuring or adjusting the processor performance state (P-state), processor operating state (C-state), processor sleep state (S-state), device power state (D-state), global system state (G-state) or similar power management feature where putting the system in a "higher state" (e.g., P3) typically consumes less power than at a "lower state" (e.g., P1).

In at least some embodiments, a customer can access information from the power management service, such as by logging into a power console, sending an API request, etc. The power management service can provide information such as the amount of energy consumption attributable to the customer, the amount of that energy consumption that is attributable to each type of resource or component used, the operational or power state of those resources or components at different times of usage, and other such information. The power management service can also, where information about the power sources and other related information is available, provide information about a carbon footprint or other amount of environmental impact attributable to that amount of energy consumption. In at least some embodiments, the service might also enable the customer to purchase environmental credits to offset at least a portion of the environmental impact.

A power management service 304 in accordance with various embodiments can also enable a customer to provide input regarding an amount of energy consumption to be used for that customer going forward, at least for a specified period of time. The customer can be provided with a variety of different energy consumption options, the selection of which might be based at least in part upon a type of customer, a level of access, a type of resource, or other such information. In some embodiments, a customer might be able to specify a maximum "instantaneous" energy level, which indicates the maximum amount of energy that can be used for processes attributed to that customer at any time. A customer in some embodiments can also, or alternatively, specify a maximum amount of energy to be used over a determined or specified period of time, such that the customer can control energy usage but allow for energy usage spikes when needed. The rate a customer is charged can be affected by the type and/or amount of limits that are applied.

In a first example, a customer might be able to specify one or more classifications of performance. For example, a customer might be able to specify that the customer wants to optimize for "performance" or optimize for "power." A customer indicating a desire to optimize for performance can cause a component such as a cloud manager or power management service to set one or more components or resources to a state of optimal performance while that resource or component is allocated to the user. For example, a CPU can be set to run at a highest speed, all memory available to the customer can be active, disks allocated to the customer can be spun up, etc. Further, any resource or component might be set to a highest operational state or power state, as may vary by component. A customer can select to optimize for other parameters as well, such as throughput and latency, among others.

Alternatively, if the customer indicates that the customer wants to optimize for power, a power management service or other such entity can attempt to reduce the amount of energy consumption to the extent possible while still meeting one or more performance metrics or other such criteria. For example, the power state of a CPU (e.g., P-state) can be adjusted for any customer instances in order to reduce energy consumption per unit time. Similarly, a power management service can analyze information such as past customer usage or performance to estimate an amount of memory, disk space, bandwidth, or other such metric that the customer will likely require, and can hot swap or power down various components, such as RAM or processors. The power management service can also spin down one or more drives in order to conserve energy when those drives are not in use. Various peripheral devices can be adjusted as well, such as to put a NIC in a low power state, run a CPU or GPU or SSD in a low power mode, etc. The service can look at the expected needs to support the customer usage, as well as any service or performance guarantees or criteria, and can determine an appropriate adjustment to be made to minimize energy consumption for that user. In at least some embodiments, the power management service can also monitor incoming requests for that customer and/or usage by that customer and adjust energy consumption levels accordingly. For example, if a customer needs more capacity to perform one or more tasks the power management service might increase a power state of a component. If the customer usage is less than expected, the service can reduce the power states of one or more components. In cases where there is a transition period to go between states, the service can also factor in the transition period energy consumption, as discussed elsewhere herein.

In other embodiments, a customer might be able to request specific actions to be taken in order to reduce energy consumption. For example, a customer might be able to provide more granular requests than "optimize for power," for example, such as "use minimum memory," "perform minimal caching," "operate in lowest possible CPU power state," or "spin down drives when not used in the last minute." In some cases, a user might even be able to request certain power states. For example, a user can specify an idle state (e.g., a "c-state") wherein the clock frequency and therefore idle power of the CPU may be reduced. Increasing the number of functional units that are stopped by cutting the clock will reduce the energy consumption (although additional time and energy will be required to wake up CPU resources and/or increase the idle state of the device). As an example of idle states, c-states for conventional devices typically run from C0, where the CPU is fully operational at a highest clock speed, to C6, which is a deep power down state. C-state values in-between correspond to different circuits and/or signals being available. A customer also can specify a preferred or target operational state (e.g., a p-state as used for certain voltage and/or frequency operating points for various processors) wherein the CPU can be running with different energy profiles, but the CPU can be capable of doing useful work in any p-state. Reducing an operating frequency and/or voltage can cause the device to enter a higher p-state. Reducing the clock frequency will reduce the operational speed of the processor, which also reduces energy consumption rate as changes in frequency have non-linear impact in energy consumption because voltage typically must be adjusted along with frequency (and power is proportional to frequency and the square of the voltage). Reducing the voltage decreases the leakage current from the transistors of the processor, making the processor more energy efficient. Voltage can often be lowered with frequency, and the effects on energy consumption are complementary. A balance can be struck between reducing the rate of energy consumption and slowing down the processor such that instructions take longer to process. A power management component then can attempt to meet the customer requests when possible, or at least come as close as is practical based on any of a number of different factors, such as host machine load, number of customers sharing a resource, etc.

In other embodiments, such as where a customer has substantially dedicated, full or "bare metal" access to one or more resources and/or components in a multi-tenant environment, the power management service can actually turn over at least a portion of the power state control to the customer. For example, the power management service might offer a power console enabling the user to set specific power states or operational states of various components, such as by turning virtual knobs for the power states of those components. As discussed above, the customer can perform actions such as to adjust the operational states or idle states of one or more processors, power down and/or hot swap memory, spin down one or more disks, adjust an operational/suspend state of one or more peripheral devices, and the like. A user not wanting to use such a component, or at least not wanting to have that component in a standby or low power mode, can also potentially power down that component for at least a period of time. Due to the amount of energy needed to bring a component back to a full operational state, however, there might be restrictions on power cycling various components. In some embodiments there might be limits on the types of adjustment and/or amount of adjustment that a customer can make to various components, as may also vary by the type of customer, type of resource, amount paid for the access, and other such factors. The customer control can be provided at any appropriate location, such as at the domU or other such layers.

The power management service can keep track of the operational state of any such component at different times when utilized by, or allocated to, a customer. An amount of energy consumption can be determined for each state, which then can be used to determine an overall amount of energy consumption for the customer. This information can be provided to the customer, used to bill the customer, used to meet regulatory requirements, or for other such purposes.

A power management service also might provide other types of customer control within the scope of the various embodiments. For example, the power management service might provide a customer with a predicted amount of energy usage for the customer, based on past customer behavior, customer usage trends, and the like. The power management service might allow a user to specify a maximum amount of energy usage over a period of time, as may be based at least in part upon the predicted amount of energy consumption. For example, the user might set the limit at the average amount of consumption, a factor such as 1.2× the average consumption, etc. In some embodiments, the customer might look at the variations in energy consumption for different periods and set the maximum such that adequate energy will be provided for most periods, with only extreme usage cases being throttled or otherwise affected. Various other settings or values can be utilized as well. Further, in at least some situations a user might set specific maximum energy values for specific components. For example, one customer might be interested in performance for a CPU, but less interested in performance for a disk drive, solid state drive, or GPU. In such cases, the customer might look to typical energy usage values for at least some of these components and specify maximum values for those individual components. Alternatively, the user might submit an option such as "optimize for processing speed" or "optimize for throughput," which might also be submitted with an overall energy maximum, and the system can determine which components to adjust or throttle in certain situations. In some embodiments, the customer can instead put a limit on the amount of carbon footprint, which can give the power management system an optional ability to select energy from different sources, or perform operations at different times, where the energy consumption will be the same but the carbon footprint per unit of energy will be lower.

Figure 4:
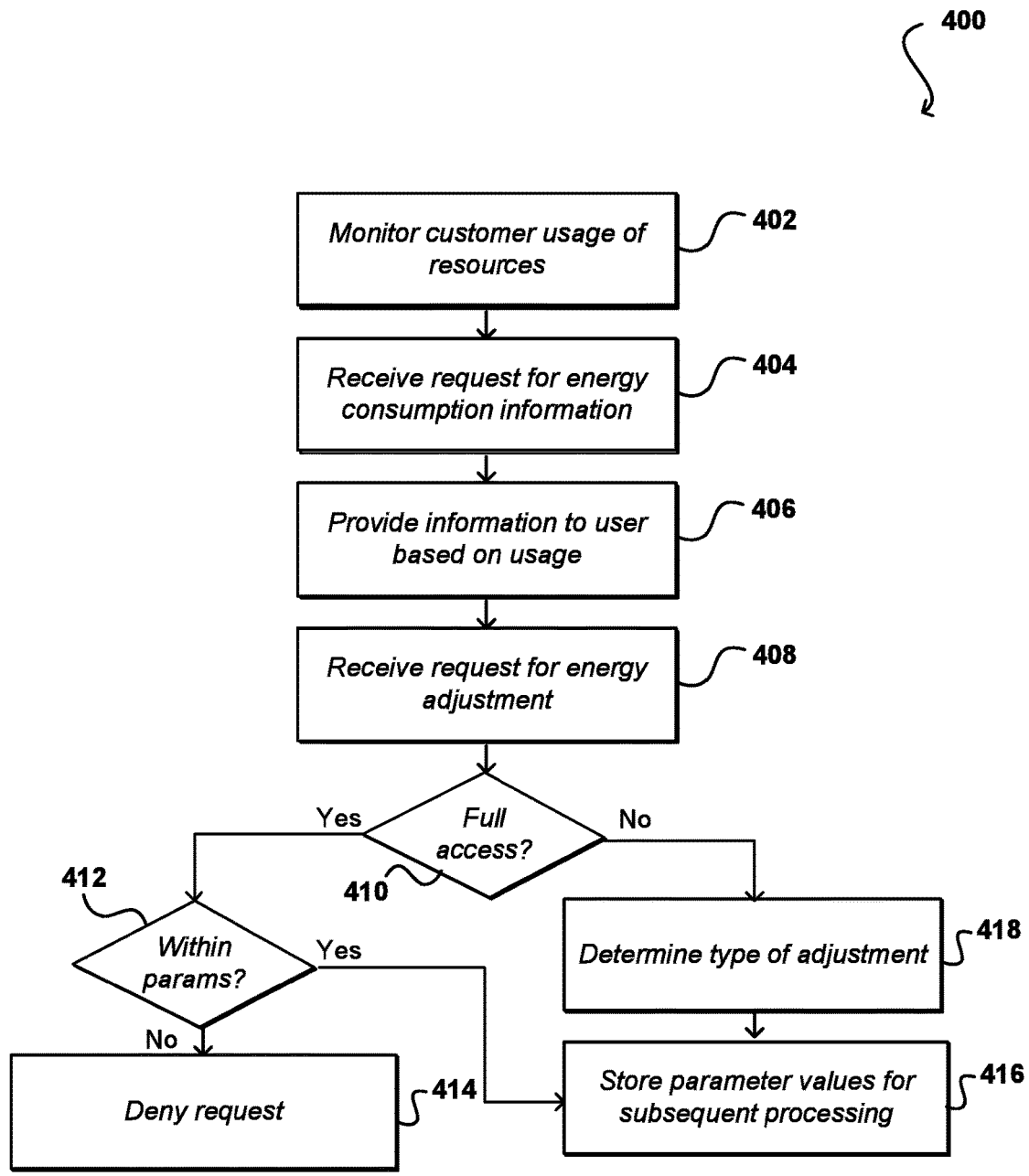
FIG. 4 illustrates an example of a process for enabling a customer to view and manage energy consumption that can be used in accordance with various embodiments.

FIG. 4 illustrates an example process 400 for enabling a customer to view and/or manage energy consumption that can be used in accordance with various embodiments. It should be understood that, for this and other processes discussed herein, that there can be additional, fewer, or alternative steps, performed in similar or alternative orders, or in parallel, within the scope of the various embodiments unless otherwise stated. In this example, customer usage of a set of resources and/or components is monitored 402 in an electronic environment. A request for energy consumption information might be received 404 from a user, in response to which the monitored energy consumption information can be provided 406 to the customer. As discussed, the energy consumption information can be broken down by component, task, period of time, or other such information. The customer, after viewing the information or otherwise, might decide to adjust an aspect of the energy consumption for one or more resources. A request might be received 408 from the customer asking to adjust the energy consumption for that customer. A determination can be made 410 as to whether the customer has full access to, or at least some control over, the resource(s) and/or component(s) associated with the request. If so, a determination can be made 412 as to whether the requested change falls within allowable parameters for the resource(s) and/or component(s). If not, the request can be denied 414, or the customer can at least be informed that the requested adjustment is not able to be provided. If the request does fall within the allowable parameters, the parameter values can be stored 416 for future work performed for the customer. If the user does not have full access, or equivalent access, a determination can be made 418 as to the type of adjustment to be made. For example, the customer might request to optimize for energy or reduce power levels of one or more components. A determination of an appropriate way to implement the request is determined, and the appropriate parameter values can be stored 416 for future work performed for the customer. Various other approaches can be used as well within the scope of the various embodiments.

The ability to optimize energy consumption using such an approach, however, can depend at least in part upon whether there are other users sharing a resource. For example, there can be multiple instances provisioned on a host machine that might utilize the same CPU, RAM, storage drives (e.g., with different partitions), peripheral devices, or other such components. Further, there might be some components where multiplexing is utilized. For example, a host machine might have a single network interface card (NIC). The cloud manager might have the NIC configured for multiplexing of management traffic and traffic for the customer, as well as traffic for any other customer provisioned on the host. In such a case, the ability of the customer to place the NIC in a low power state can be limited at least in part by the needs of the cloud manager and/or other customers. For example, the power management service may need to reconcile the aggregate requirements for a given resource against the individual requests of customers, so customer requests may not always be satisfied even if the underlying resource is capable of satisfying the customer's request when used in a non-virtualized or otherwise dedicated fashion.

In at least some embodiments, a component such as a CPU, a NIC, or a graphics processor (i.e., GPU) can be able to switch power states, operating frequencies, operating voltages, or other operational parameters for different customers or types of traffic, etc. Sets of operating parameters for various customers or tasks are referred to herein as "contexts," where each context includes a specific set of operational parameters in accordance with customer preferences or specifications, etc. In order to provide an appropriate accounting of energy usage during a context switch, however, a mechanism might be needed in embodiments where the information is not made available to software, such as where a hypervisor component is not running on a CPU at the same time as a guest OS of a customer. In at least some embodiments, a shared component can determine which customer is active during which times, and can provide a reporting about the customer and the state and/or energy consumption during that time. Such an approach enables the switching of one or more contexts, while providing an accurate accounting of the energy consumption per customer during the context switch.

There can be various aspects of a machine, real or virtual, that can be switched between customers. A switching process not only can take different amounts of time for switching different components between different contexts, but can also require different amounts of energy. In a processing environment, for example, a component such as an operating system or a hypervisor layer can switch processor power settings. A mechanism can be implemented, in hardware and/or software, that is able to determine the amount of energy consumed during the context switch, which can then be apportioned to one or more respective customers for the previous or current context resulting from the switch. In addition to simply lumping an overhead cost for operating a platform during a context switch on one of the customers, approaches in accordance with various embodiments attempt to amortize, apportion, or otherwise attribute portions of the overhead costs to specific customers. Approaches in accordance with various embodiments can attempt to precisely determine a cost for operation of each underlying resource not distinctly associated with a virtual machine or other such component, as may be attributable to context switching or other such service overhead.

In at least some embodiments, a hardware solution can be implemented to attempt to determine energy consumption for one or more components during a context switch. For example, a component such as a NIC can receive an identifier (ID) associated with a customer, such as an ID associated with a virtual machine (VM) of the customer, such that the NIC can know which customer is using the NIC for an upcoming period of time. The information about the customer can be stored by a cloud manager, a power management service, the NIC, or any other appropriate location. In some embodiments, the power management service can know that traffic for a particular customer is currently using the NIC, and can know the power state of the NIC for that customer, such that the power management service can determine the amount of energy consumption for the customer (based at least in part upon the power management service knowing a rate of energy consumption for that component in that state).

For a device such as a CPU, where multiple users might have instructions processed by the processor at different times, portions of the processing time or "time slices" can be allocated to various customers. Certain CPUs can determine the amount of energy used by that processor over a period of time. A CPU might receive a request with a VM_ID, and can track the amount of energy consumption attributable to that VM_ID. In other embodiments, a CPU can know the VM context in which it is currently running. The processor can then expose (e.g., to the hypervisor) energy consumption information by VM_ID, which can be used by the power management service to attribute that energy consumption to the relevant customer. In some embodiments, a CPU might include a counter of energy consumption that resets with each new VM_ID received. The CPU can know when it is processing instructions in a particular state for a particular customer, and knows when it is cycling through different operational states and idle states in response to a particular VM instruction. The CPU can account for this information internally. A hypervisor or other virtual memory manager can potentially read this information on a regular basis, or at designated times, using interrupts or other appropriate mechanisms. The processor in some embodiments can track the number of Watts used over a period of time, and report or expose that information by VM_ID for a particular time slice.

For a component such as RAM or a solid state drive, the amount of energy for at least some of these components can be considered to be fixed, such that the amount of energy consumption can be calculated even if the component itself does not assist in the accounting. In some instances, a customer can down-clock or down-voltage a solid state device, in order to draw substantially less energy per unit time. In some situations, however, a cloud manager might offer the ability for customer "ballooning" RAM, where a customer can potentially obtain a capacity commitment beyond an amount dedicated for that VM. Accordingly, a dynamic calculation might need to be performed to account for actual usage at any given time. For example, between time point 0 and 10, the customer might use RAM amount N clocked at full voltage. Between time point 10 and time point 20, the customer might use RAM amount (N+M) (obtained via "ballooning") clocked at a lower voltage (and thus performance). The system can perform dynamic calculations across the total time period to determine total energy usage.

A hardware accounting mechanism can be implemented in various other types of components as well. For example, a hard drive might receive an I/O request with a VM_ID. In addition to the read or write time, the drive can also charge the VM with the time needed to swing the arm or otherwise locate the data position on the disk. A counter or other mechanism can log the time and/or type of activity, and if possible can calculate and log the amount of energy consumption for each period of activity of each type, and then can provide that information for each respective VM_ID.

In some embodiments, mechanisms such as memory map registers or machine state registers (MSRs) can be used to enable per-VM performance counters that utilize units of energy consumption. The CPU can know how much energy consumption occurs at each of the operational states or idle states, for example, and can increment the per-VM performance counter with each unit of consumption for the appropriate VM. These counters in at least some embodiments include registers that can be read and zeroed by software, in order to provide the necessary consumption information for each VM.

Each time there is a VM context switch for the CPU, the registers can be read out and zeroed in order to apply the next counts to the new VM context. In embodiments with multiple counters, the CPU can instead switch to incrementing the appropriate register at a VM context switch. The counter can be updated at any appropriate time, such as at regular intervals, upon each unit or number of units of energy consumption, etc. The counter also can be updated at each idle state, operational state, or other such transition. The counters can be updated with wattage information in some embodiments, which is computed for a VM using the current task and/or state of the processor, which can be written into an MSR and read by software for metering or other such purposes. The register thus can expose the wattage of the CPU over a period of time along with the ID of the VM associating with that wattage, such that an appropriate accounting can be performed. In embodiments with dynamic adjustments, a cloud manager or power management service can pull the data from the register and perform any calculations needed to adjust a power state of the CPU or other such aspect. The software reading the register could be in any appropriate location, such as in the dom0, in user mode code, in the dom0 kernel, in the hypervisor, etc. Once the data is obtained, the data can be treated like any other network monitoring data, and fed into a billing service, green service, energy budget accounting service etc. As discussed, such hardware counters, registers, or other such mechanisms can be added to any appropriate components as well, such as RAM, peripherals, hard drives, solid state drives, and the like.

In some embodiments an agent can be used to provide accounting information to a component such as a power management service. The agent can be a software agent configured to execute within a client instance or on a host machine, for example, in order to expose the energy usage and/or resource allocation usage to the power management service or another appropriate entity. In some embodiments, an agent can provide performance information to the dom0 or another appropriate component. In some embodiments, an alternative "agent" can effectively be implemented through guest VM (i.e., "domU") OS kernel modifications.

Figure 5:
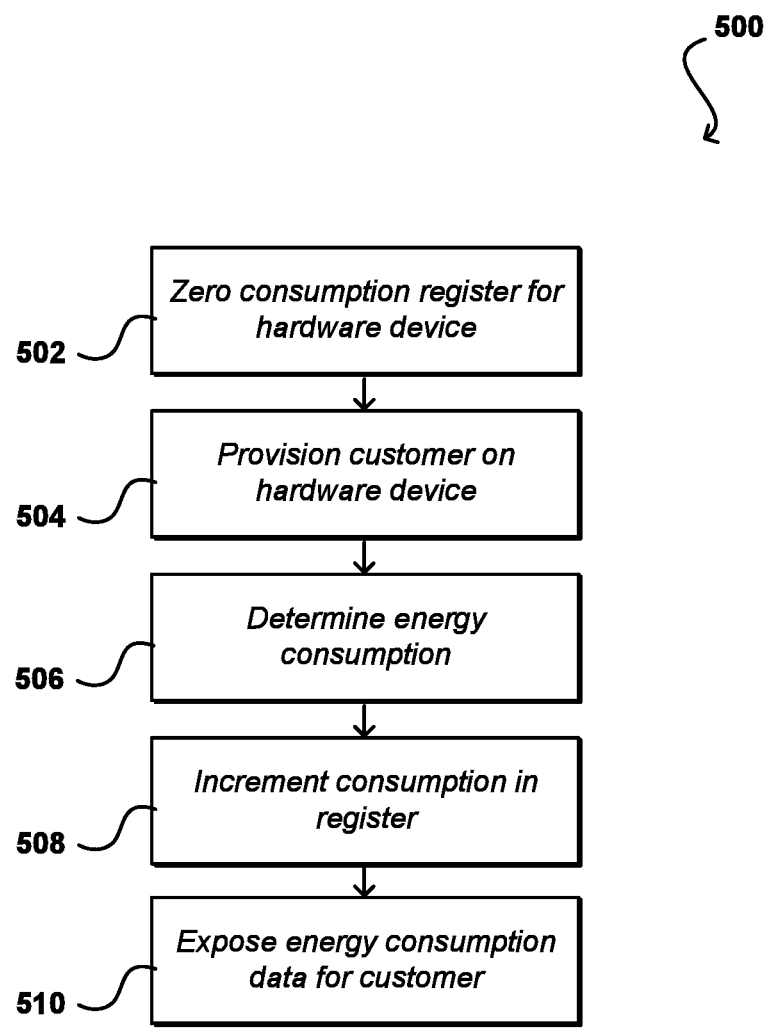
FIG. 5 illustrates an example of a process for obtaining customer-specific energy consumption information from a hardware component that can be used in accordance with various embodiments.

FIG. 5 illustrates an example process 500 for obtaining energy consumption information from a hardware device that can be utilized in accordance with various embodiments. In this example, a consumption register is zeroed 502 for a hardware device. The register can be assigned to a particular customer or VM, or a general register. The customer (or a VM for the customer, etc.) can be provisioned 504 on, or otherwise allocated usage of, the hardware device. While the customer is provisioned on the hardware device, the hardware device can determine 506 an amount of energy consumption based at least in part upon a current state of the hardware device and/or the types of activities being performed. Energy consumption 506 may be directly provided by the underlying hardware, or may be inferred from other information as described below. At one or more appropriate times, the consumption register is incremented 508 with the amount of energy consumption since the last increment or other register event. The consumption register can be exposed 510 to software and/or hardware in order to provide an accounting of the actual energy consumption of that resource that is attributable to the customer.

In some embodiments, software can attempt to infer an amount of energy consumption. For example, a power management service can have information about rates of energy consumption for particular activities, and can monitor customer traffic and allocations in order to determine an approximate amount of time that the customer performed each activity. Such an approach can at least provide a reasonable approximation of energy consumption for the user.

As discussed, when changing a VM context on a resource or component, a counter, register, agent, or other such component can be updated in order to provide accounting for the new VM context. At or around the time of the context switch, however, a power management service and/or cloud manager component can cause information for the previous VM context to be stored such that when that VM context is again provisioned on that resource or component, the VM can obtain the same level of performance. For example, if a customer was using a high clock frequency state (e.g., "turboing") before the transition, the customer might reasonably expect to resume turboing when provisioned back on the resource. The storing of VM context information related to energy management settings can be performed in hardware and/or software in different embodiments. For example, the OS when performing the switching could dictate the appropriate power states, or the OS could give a component the appropriate VM_ID, which the component could use to determine the appropriate power state. Various other approaches can be used as well.

During context switching, such as when going between customers or VMs, there also will be some energy consumption due to the switching. This can include storing information for the previous state, storing information for the new state, and actually switching the states. The overhead for the switch can be charged to either customer or both customers. For example, each customer might be charged the overhead for switching to the associated VM context, but not switching to the other VM context. Such an approach might not be fair, however, such as where the previous VM was running with very unusual parameters, providing for a significant context switching overhead. In some embodiments, the overhead for switching a new VM on can be split between the previous VM and the new VM. Various other allocation approaches can be used as well. Further, the overhead for other context switching can be charged to appropriate customers as well. For example, a processor can know how much energy is consumed to go from one p-state transition to another. If the switch occurs during a particular VM context, the counter for that VM can be updated according to the amount of overhead for the transition. Such an approach might prevent a customer from frequently switching states to try to conserve energy, where the energy consumption associated with the switching might be on the order of the amount of energy consumption saved.

In at least some embodiments a new machine instruction can be introduced that is able to store state information for a customer to a data block or other such location. The instruction can provide an extensible mechanism of providing energy saving and restoring, such as by causing power state information to be stored to, and restored from, a specified location. The instruction can also cause timing information to be stored for a context switch, such as may indicate an amount of time needed to transition to a different power state or context. Certain embodiments can utilize a single instruction that automatically stores state information to one area and restores state information from another. The instruction also can cause timing or other information to be stored that can later be used to determine the actual cost for the transition, whether for an integer state or a floating point state, for example.

Similarly, a software-based approach can obtain and store state information for a context switch, and can also obtain energy usage information for the switch. In at least some embodiments, an application can poll the amount of time during the previous cycle that a processor was in one or more operational states and/or sub-states. As discussed, one approach can involve reading a set of registers, storing the information in a memory location, and then reading other registers from another memory location belonging to another process or virtual machine. Those values can then later be swapped back in. At the same time, it can be desirable to pull sub-information from the hardware that would not otherwise be determinable, at least from a hardware perspective.

In one example, the operating system of a machine can be in charge of switching between different idle states. In conventional designs, the operating system may have no knowledge about the operation of a processor, such as when the processor is operating in a turbo mode, higher voltage state, or other such state. The operational mode of the processor is typically controlled by microcode within the processor itself. In order to determine energy consumption during a period of time, it is necessary in at least some embodiments to be able to determine the operational mode or state of the processor, in order to calculate how much energy was used by the processor during a particular power cycle. Other information can be determined as well, such as the average and/or median frequency, etc. As the processor does automatic switching between states, it can be desirable to obtain information about these switches in order to provide more accurate feedback and/or accurate charges to the respective customers.

In sections discussed previously involving storing state information in registers, energy consumption was inferred. In some conventional implementations, a processor might oscillate between different power saving modes when a particular OS defined idle state is entered. There also is no mechanism provided for monitoring idle states, sometimes otherwise referred to as c-states, or other information such as clock frequencies or performance frequency scaling mechanisms, which can also be referred to as variable power, turbo mode, or speed-step technology. An approach in accordance with various embodiments can compute the energy information from information that is, or might be, available in the processor, where the information can include scaling information, the length of time the processor has been operating at a particular frequency, or other such information.

Such monitoring can apply to other functions of a processor or other such component as well, such as functions sometimes referred to as "uncore" functions. These functions can include functions that are not in the core of a processing component, but can be useful or even necessary for core performance. While core components are typically involved in executing instructions, uncore functions can include components such a memory controller, QPI controller, L3 cache, PCI bus controller, and the like. The uncore components can be other integrated circuits connected to a processor, or can be part of a processor package. At least some of these uncore functions can be adjusted as well, such as by clocking up or down the operating speed of these components, in order to adjust energy consumption. Similar adjustments can be made to components not directly associated with a processor, such as by adjusting the operating frequency of memory components, PCI components, interconnect, HyperTransport or QPI components, etc. Further, the operating frequency, voltage, or other such values of each of these components can be determined for a particular power cycle in order to determine the energy consumption over that cycle. The consumption for these components then can also be attributed to individual customers based at least in part upon their usage profiles over that power cycle. In some embodiments values such as operating frequency and voltage can be regularly sampled, such as with millisecond granularity, in order to enable energy consumption numbers to be inferred. Approaches for attributing portions of the consumption among various customers are discussed elsewhere herein.

Certain embodiments can utilize at least one machine instruction that enables energy state information to be abstractly saved and stored, as discussed herein. Such an approach enables context energy switching and restoring APIs, or other such interfaces, to be exposed and programmed as appropriate. A machine instruction can also be used that is analogous to a read time stamp counter. A "time stamp counter" is used to measure how many clock cycles have elapsed. An "energy consumption counter," on the other hand, can provide an accounting of the amount of energy in Watt*hrs (or milliWatt*seconds, joules, etc.) consumed. The energy consumption counter can be utilized in some embodiments by obtaining the value of the counter at the beginning of a relevant time period and again at the end. The difference can indicate how much energy was consumed during the operating period. In at least some embodiments, each core or hardware thread can have its own counter. To fully compute the amount of energy consumed in such an example, the amount of energy can be obtained for each core associated with a particular operation, and those amounts added together. The hardware can also account for subtleties around two hardware threads sharing a core (e.g., Intel Hyperthreads or AMD module core pairs) by apportioning energy according to the number or type of instructions processed on each hardware thread. The instruction can also provide a counter for the hardware context, which attributes a certain amount of energy consumption, and can be used to convert directly to an amount of energy (i.e., Joules) over time. A time stamp counter will provide a number of units of time, in machine cycles, and the machine instruction can, at a given time stamp, calculate how many Watts have been consumed for a particular energy context, thread, CPU, core, package, etc., which can be used to estimate energy consumption for a particular context.

While it might be desirable to simply add an energy meter to at least some of these components, such an approach will not provide accurate information in at least some cases as conventional hardware is unable to determine which portion of a component is performing a task for a certain customer while another portion is performing a task for another customer. As an example, in the case of hyper-threads it might not be clear which customer is associated with each thread, or to determine which portion of the core is performing a high energy action or a low energy action. If one user is using a portion of the core for a very energy hungry task (e.g., floating point operations) and another user is using a portion of the core for a task that requires very little energy (e.g., idling using MWAIT or HLT), it would not be fair to evenly split the energy consumption for the core among those customers. It thus can be desirable in at least some embodiments to be able to track energy consumption on an instruction, action, or task basis, for example, which enables more accurate tracking for each particular customer.

Individual instructions can vary between having relatively low energy impact and relatively high energy impact. For example, a "move" instruction that moves data from one register to another might take almost no energy, whereas a floating point "divide" instruction might use substantially more energy, such as at least 100 or 1,000 times as much energy, to calculate the results for one instruction. In the case of hyper-threading, for example, these tasks might be assigned to the same core to be processed concurrently. In order to provide a relatively fair estimate of respective energy consumption, the process can execute an instruction-level tabulation whereby the processor provides the number of instructions of each type that were performed and approximate a certain energy consumed by that type of instruction. Without this information, it can be difficult to infer which instructions have been processed during a particular period or cycle, as processors can issue several instructions in parallel to a particular core, which might be spread across hyper-threads, which can make it difficult to otherwise determine which instructions were processed in even the last clock cycle. Using a component such as a read energy consumption counter enables a processor to approximate the energy based on the instructions that are flowing through on a particular hardware or thread context.

In at least some embodiments the timing of a transition can also be determined. It can be relatively expensive to adjust a component, such as to move the processor to a different operating voltage. A software-based approach can issue a "read-timestamp-counter" or similar call, wait for an operation to complete, and then issue another call to determine how long it took to complete the transition. A potential downside to such an approach is that it still can be difficult to ensure that the charge for a long transition is apportioned to the correct customer, and that another customer's time allocation is not taken up by energy transition states for another customer. This can occur for both the transition to, and from, a particular power state. A hardware-based approach can provide at least some additional benefit in certain embodiments, as for a transition the processor will be synchronized and all the executing contexts drained. A change in frequency or voltage can be performed, and in the process the value of the energy consumption counter can be read to determine the transition time. In at least some embodiments units can be provided for changes to the clock frequency or voltage regulator, the energy consumption for which can then be apportioned per one or more policies to the appropriate customer(s), such as for the previous context, current context, or a new context (e.g., one associated with "system overhead"), etc.

Figure 6:
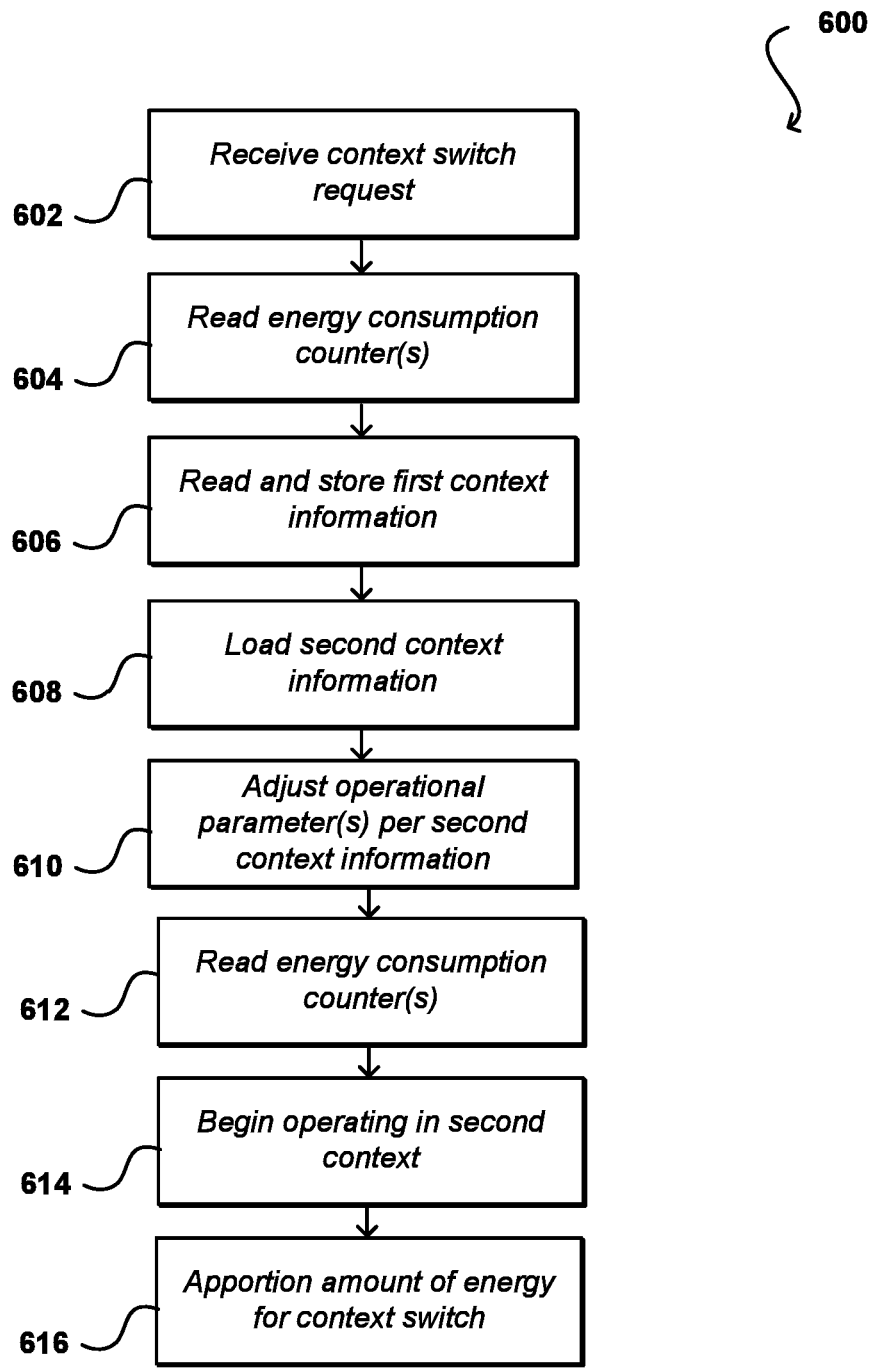
FIG. 6 illustrates an example of a process for obtaining customer-specific energy consumption information using an energy consumption counter that can be used in accordance with various embodiments.

FIG. 6 illustrates an example process 600 for determining energy consumption utilizing one or more energy consumption counters that can be utilized in accordance with various embodiments. In this example a request or instruction is received 602 indicating to perform a context switch for one or more components in a multi-tenant environment. Before initiating the context switch, one or more energy consumption counters for the components can be read 604, in order to determine a "zero" point for the context switch. First context information, for the current context, can be read 606 from the components (or other such location) and stored to an appropriate location, as discussed herein. Second context information, for the new context corresponding to the switch, can be loaded 608 or otherwise obtained and one or more operational parameters of the one or more components can be adjusted 610 per the second context information. As discussed, this can involve updating an operational voltage, frequency, or other such aspect, which can also differ between components. When the context switch is complete, the one or more energy consumption counters can again be read 612 to determine an amount of energy consumption attributable to the context switch. Using approaches discussed elsewhere herein, the amount of energy consumption then can be allocated or apportioned 616 across the customers associated with the first and second contexts, etc.

In an alternative embodiment, the context switch can be bundled with the execution of the new context 614. That is, the amount of energy consumption can be allocated or apportions 616, and then the amount of energy consumption attributable to the context switch determined 612 when operating in the second context begins 614. Using such an approach, the energy consumption counter does not have to be read again until the system is ready to swamp contexts again. In this way, power consumption for the context switch to the new state plus any energy consumed during execution of that context can be measured together. Thus, in at least some embodiments there is no need for separate instructions to measure the energy stamp and transition the context. There can be a single instruction called to transition the context, and when changing to the new context the value of the energy consumption counter can be used to compute the amount of energy since the last context switch. The read energy consumption counter can also be implemented as a separate instruction also, enabling periodic evaluations to monitor and adjust on-going consumption and operational state.

By being able to determine an approximate amount of overhead and energy consumption for a context switch, a system can reduce the energy consumption by ensuring that context is not changed until at least a certain amount of work has been performed in order to justify the additional overhead and consumption for the switch. As an example, if a context switch will require x Joules, then the context switch might not be allowed until at least 1,000x (or some other amount) of work has been performed for the current context. Approaches to application context switching in a processor can be used as examples of ways in which to determine when to perform an energy context switch.

Introducing machine instructions enables energy consumption determination to be more natively supported in the hardware, and can provide for more accurate determinations. As discussed, these instructions can enable calling an energy consumption counter, as well as saving and restoring power states. In some embodiments the save and restore operation can integrate the functionality of the energy consumption counter as well. As a byproduct of actually performing the save and restore, the operation can output the energy consumption counter information as well as part of a single unit (although the information can be available independently as well). A system assumption can be made that the energy consumption counter should be read any time the energy context is to switch, although the energy consumption counter can be monitored separately in at least some embodiments.

Being able to determine energy consumption with improved granularity also enables computing scheduling to be performed based at least in part upon incremental energy consumption. As an example, a customer might want to run an operation until it has consumed an amount of energy, or might only want an operation to at most consume a specified amount of energy. The system can monitor the amount of energy consumption for the current context, and if the customer only wants to run an operation until a specified amount of energy has been consumed, the system can switch contexts when that amount of energy consumption is reached. The energy consumption counter enables a determination of when to context switch based at least in part upon energy consumption, effectively enabling the system to support "energy slicing" in addition to time slicing when supporting operations for multiple customers.

Various approaches can enable users to determine various energy quanta. The energy costs for transitioning between various states might be able to be apportioned in different ways for different applications, environments, or customers. A quantum might not be a fixed budget or limit on an amount of energy used for a given energy cycle or other such period, but might instead involve increasing the efficiency of use during a given time quantum. In some embodiments it might be only slightly more expensive to allow a user to have a task performed at a higher operating frequency, such that a customer might be able to be given a shorter time quantum but allowed to use the customer's energy budget sooner. Such approaches allow for more dynamic scheduling than conventional approaches. Various monitoring mechanisms can also be used, which can be similar in at least some aspects to profile counters used in various processors. A monitoring mechanism can monitor the number of instructions that have been executed over a period of time. A hardware monitor for a customer could obtain a stamp of the current execution state to determine that a percentage of the workload for the customer has been completed. In some embodiments, the customer can provide information about the size of the workload, the number of instructions in the workload, the types of instructions in the workload, the percentage completion of the workload at different periods of time, and other such information. In some embodiments there can be instructions of different types or classes, each having an associated rate of energy consumption, and the customer can provide information regarding the percentage, number, or other such measure of the types and amounts of classes in the workload. In some embodiments, the system can make an estimate based on the instructions that have been encountered, and assume that those instructions are representative of the workload, while in other embodiments a customer might provide information about uniformity of the workload.

Assuming that the workload will behave similarly going forward, the customer might specify a limit on the amount of energy that should be used to finish the workload. The processor can then, based at least in part upon the performance, energy used or instruction types encountered up to this point, determine appropriate power states, voltages, or other such parameter values to be used in completing the workload with the desired efficiency and time period. If the energy goal cannot be reached, an estimation can be provided to the customer for approval or the processor can be configured to come as close to the energy or time period target as possible. Various other such approaches can be utilized as well. The hardware monitors thus can be used to assist in setting the processor power states directly based at least in part upon the actual execution of part of the customer workload.

Figure 7:
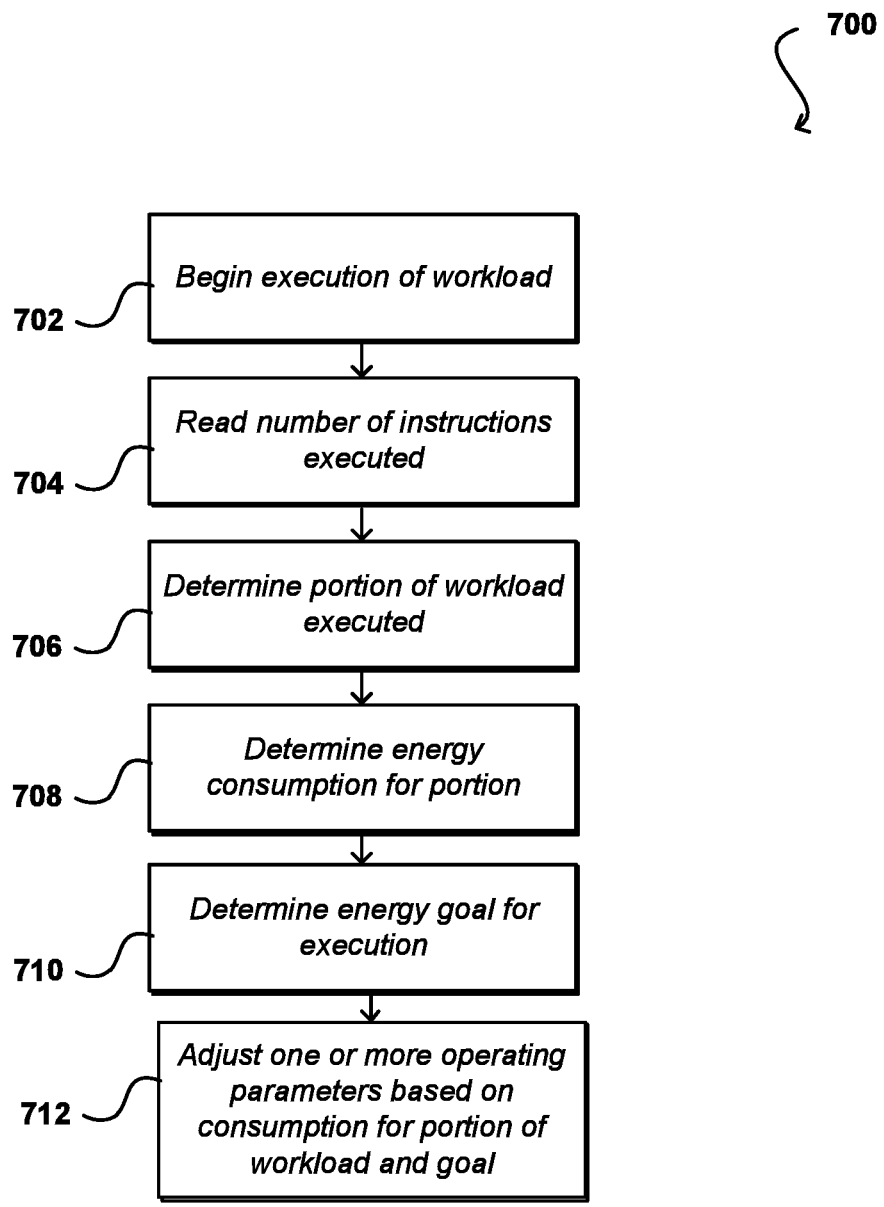
FIG. 7 illustrates an example of a process for adjusting operational parameters based at least in part upon monitored energy consumption for a customer that can be used in accordance with various embodiments.

In some embodiments a sampling mechanism can be configured to periodically determine performance with respect to execution of a customer workload. FIG. 7 illustrates an example process 700 that can take advantage of such a sampling mechanism in accordance with various embodiments. In this example, execution of a workload for a customer is started 702. As discussed, the workload can include one or more tasks to be performed by one or more shared resources in an electronic environment. A hardware monitor can be configured to monitor certain hardware during execution. The hardware monitor in some embodiments can be contacted in order to read or determine 704 the number of instructions that have been executed as part of the workload, in order to determine 706 how much (e.g., a portion, percentage, number of instructions, or amount of time) of the workload has been processed. In other embodiments, the energy consumption counter might provide the information direction, or a customer might call into the system, using an API or other such interface, in order to indicate a portion of the workload that has been completed, and might also call in when specified percentages of the workload have been reached. In some embodiments, the system can make a call to a customer system, control plane, or other such entity to obtain a measure of the percentage of the workload that has been completed, as well as potentially other information about the remaining portion of the workload. In still other embodiments, historical usage data for a customer might be used to infer a type and/or amount of a remaining workload portion. A similar call can be made to determine 708 how much energy has been consumed that is attributable to the portion of the workload that has been executed, as may be determined using an energy consumption counter or other such mechanism discussed herein. An energy goal for the workload can be determined 710, which may have been previously designated or set in response to the energy information. Based at least in part upon the performance for the portion of the workload, the remaining amount or length of time to process the rest of the workload, and the energy consumption target or goal, one or more operating parameters for the components can be adjusted 712 in order to attempt to reach the energy consumption target, or at least come as close as possible and/or practical. For example, a processor can adjust various operating parameters, such as to adjust an operating frequency or voltage, in order to adjust the performance to more closely reach the energy target. Various software monitoring and analysis mechanisms can be used as well in various embodiments.

In at least some embodiments a customer can also register for physical interrupts based on certain events or occurrences. For example, a trigger can be created to indicate when the customer has consumed a specified amount of energy. A machine state register (MSR) or other such register could be programmed such that a hard trigger is generated when an operation for a customer has consumed a specified amount of energy. Such an approach enables use of an interrupt-based delivery mechanism. Interrupts can be used for other purposes as well. For example, an energy consumption counter or other monotonically increasing counter that might have a maximum value, after which the counter "rolls over" and goes back to zero. An interrupt can be thrown any time such a rollover occurs in order to ensure that the change in count value is accounted for when calculating energy consumption.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing energy consumption of resources, comprising:
   starting execution of a workload for a customer using at least one virtual machine in a multi-tenant environment, the workload including one or more processing instructions, the at least one virtual machine executing the workload on a shared resource within the multi-tenant environment;
   receiving an indication that an amount of energy consumption has been utilized by the at least one virtual machine in the execution of the workload in response to an interrupt configured to provide the indication for the amount of energy consumption;
   calculating a rate of energy consumption, for the execution of the workload, using the at least one virtual machine receiving indication of a remaining amount of the workload yet to be executed;
   determining that the rate of energy consumption for execution of the remaining amount of the workload will miss an energy target for the execution of the workload;
   determining, based on whether the customer has at least partial control over the shared resource, a level of access the customer has over the shared resource; and
   adjusting, based at least in part on the level of access, at least one operational parameter of the at least one virtual machine during execution of the workload to adjust the rate of energy consumption prior to the energy consumption missing the energy target.

2. The computer-implemented method of claim 1, further comprising:
   monitoring the amount of energy consumed in adjusting the at least one operational parameter and allocating the amount of energy to the execution of the workload.

3. The computer-implemented method of claim 1, wherein the at least one operational parameter includes at least one of an operational mode, an operational state, an operational frequency, or an operational voltage of the at least one virtual machine.

4. The computer-implemented method of claim 1, wherein the interrupt is triggered in response to a threshold being exceeded or an amount of time being reached per a device timer.

5. The computer-implemented method of claim 1, wherein calculating the rate of energy consumption includes receiving, from an energy consumption counter, an amount of energy consumed and, from a time stamp counter, an amount of time over which that amount of energy was consumed.

6. The computer-implemented method of claim 1, further comprising:
scheduling execution of the remaining amount of the workload based at least in part upon the rate of energy consumption for the execution of the workload.

7. The computer-implemented method of claim 1, wherein determining that the rate of energy consumption for execution of the remaining amount of the workload will miss the energy target for the execution of the workload includes:
calculating a relative number of different types of processing instructions included in the remaining amount of the workload; and
calculating, based on past energy consumption for workloads with a similar relative number of the different types of instructions and the relative number of different types of processing instructions, the rate of energy consumption for execution of the remaining amount of the workload.

8. The computer-implemented method of claim 1, further comprising:
receiving information regarding a relative number of different types of processing instructions in the workload from a customer.

9. The computer-implemented method of claim 1, further comprising:
adjusting the at least one operational parameter in response to variations in measured rate of energy consumption over one or more periods of time.

10. The computer-implemented method of claim 1, further comprising:
enabling a user to specify a time target and an energy target for execution of a workload; and
determining a value for each of the at least one operational parameter based at least in part upon the time target and the energy target.

11. A non-transitory computer-readable storage medium including instructions that, when executed by at least one processor of a computing system, cause the computing system to:
receive, in response to an interrupt, notification that an amount of energy consumption has been utilized by at least one virtual machine executing on a shared resource in execution of a workload;
calculate a rate of energy consumption for the execution of the workload and a remaining amount of the workload yet to be executed, the workload including one or more processing instructions;
determine that the rate of energy consumption for the execution of the remaining amount of the workload will miss an energy consumption criterion;
determine, based on whether the customer has at least partial control over the shared resource, a level of access the customer has over the shared resource; and
adjust, based at least in part on the level of access, at least one operational parameter of the at least one virtual machine during execution of the workload to modify the rate of energy consumption prior to missing the energy consumption criterion using current operational parameter values.

12. The non-transitory computer-readable storage medium of claim 11, wherein the notification is received in response to the interrupt from a user associated with the workload, the interrupt triggered in response to a threshold being exceeded or an amount of time being reached per a device timer.

13. The non-transitory computer-readable storage medium of claim 11, wherein calculating the rate of energy consumption includes:
determining a number of processing instructions of at least one type that were performed by the at least one virtual machine; and
calculating an amount of energy consumed in performing each instruction of the at least one type.

14. The non-transitory computer-readable storage medium of claim 11, wherein calculating the rate of energy consumption includes receiving, from an energy consumption counter, an amount of energy consumed and, from a time stamp counter, an amount of time over which that amount of energy was consumed.

15. The non-transitory computer-readable storage medium of claim 11, wherein execution of the remaining amount of the workload is performed after a period of delay, the period of delay consuming at least one hundred times more energy than adjusting at least one operational parameter.

16. The non-transitory computer-readable storage medium of claim 11, wherein the at least one virtual machine is configured to approximate an amount of energy consumption based at least in part upon a number of processing instructions flowing through the at least one virtual machine on a specified context.

17. The non-transitory computer-readable storage medium of claim 11, wherein the instructions, when executed by at least one processor of a computing system, further cause the computing system to:
monitor the amount of energy consumed in adjusting the at least one operational parameter and allocating the amount of energy to the execution of the workload.

18. The computer-implemented method of claim 11, wherein the at least one operational parameter includes at least one of an operational mode, an operational state, an operational frequency, or an operational voltage of the at least one virtual machine executing on the shared resource.

19. The non-transitory computer-readable storage medium of claim 11, wherein the instructions, when executed by at least one processor of a computing system, further cause the computing system to:
schedule execution of the remaining amount of the workload based at least in part upon the rate of energy consumption for the execution of the workload.

20. The non-transitory computer-readable storage medium of claim 11, wherein determining the rate of energy consumption includes sampling a machine specific register (MSR) that records instantaneous power consumption.

* * * * *